Figure 1:
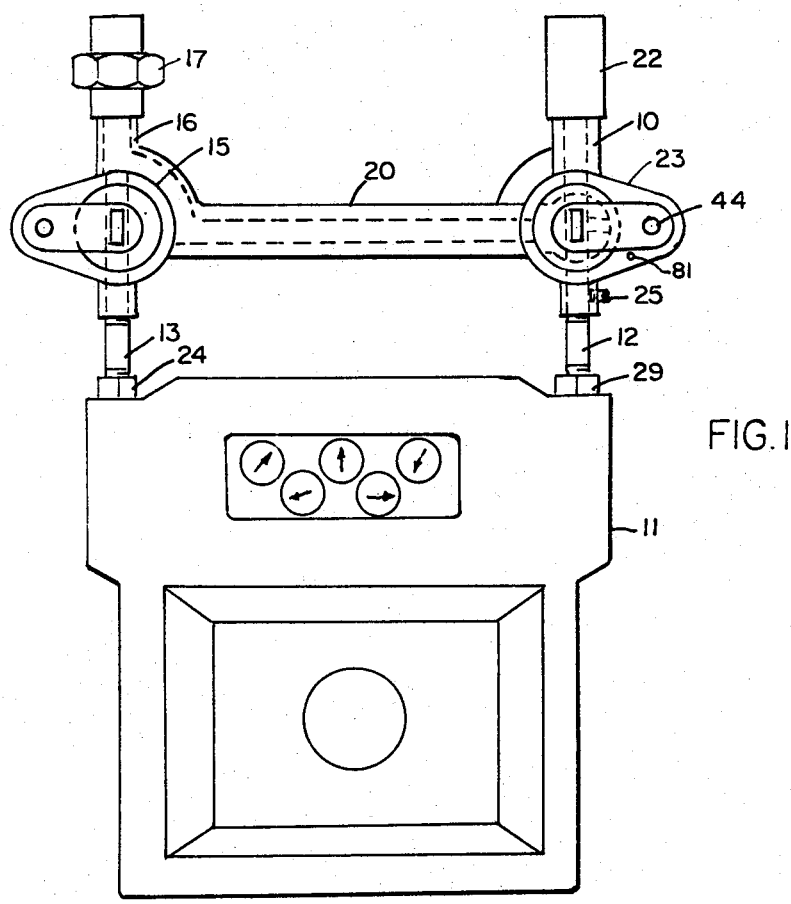

June 4, 1968  A. A. DRISCOLL  3,386,473
BY-PASS GAS METER HANGER

Filed May 17, 1965  2 Sheets-Sheet 1

INVENTOR
ALBERT DRISCOLL
BY,
Richard F. Beneway
ATTORNEY

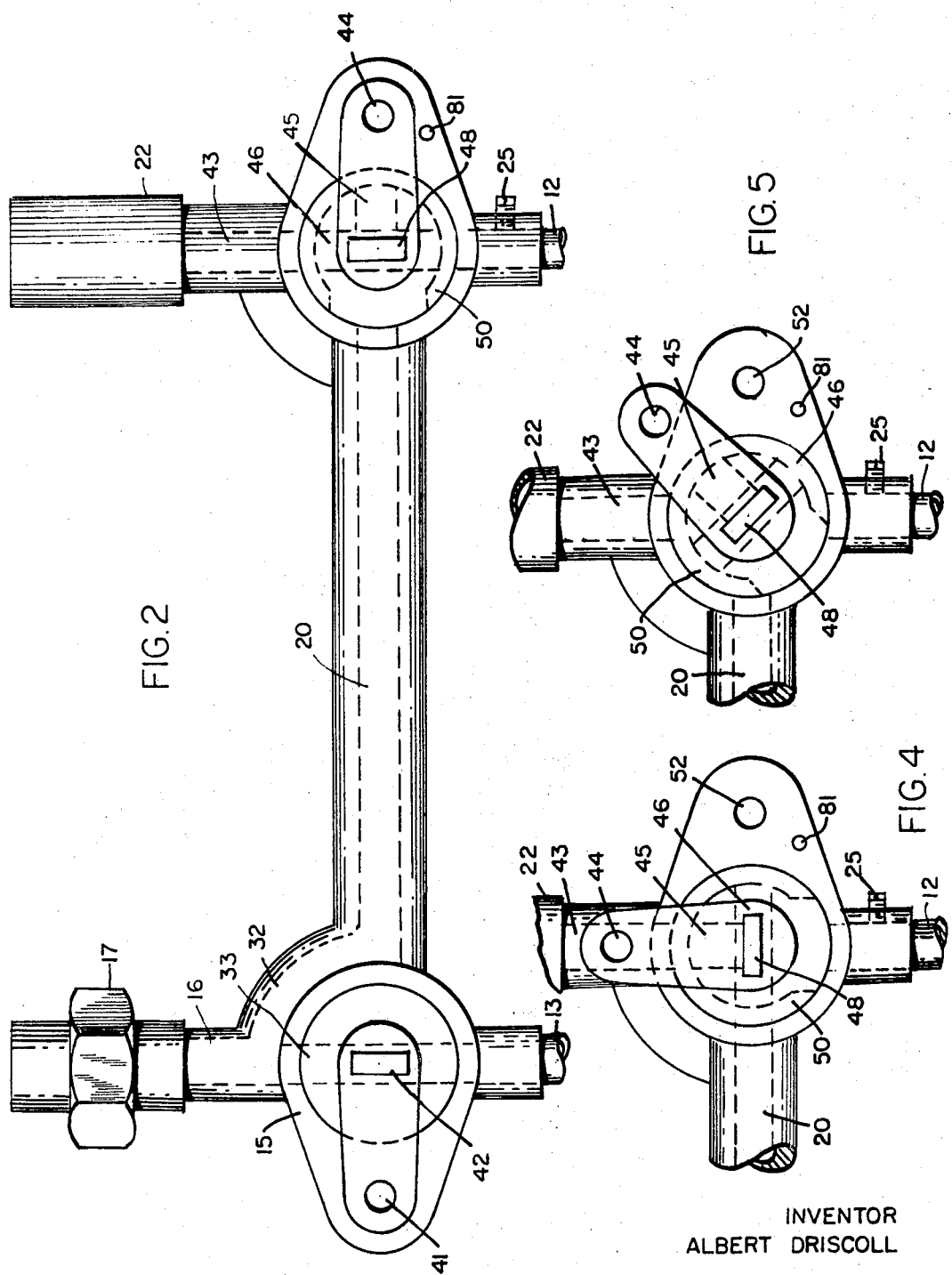

United States Patent Office 3,386,473
Patented June 4, 1968

3,386,473
BY-PASS GAS METER HANGER
Albert A. Driscoll, c/o J. J. Mooney, Esq., 21 York St., Canton, Mass. 02021
Filed May 17, 1965, Ser. No. 456,379
1 Claim. (Cl. 137—599.1)

This invention relates to gas meter hangers and more particularly to gas meter hangers that incorporate means for by-passing the meter.

It is well known that meters must periodically be checked for accuracy or occasionally replaced with a newer more up-to-date meter or replaced due to leaks, etc. When such activity is engaged in under present conditions, it is frequently necessary to contact all the gas customers supplied from said meter be they homeowner or resident in an apartment house, so that each individual is cautioned against the fact that the meter will be changed. The gas company service man will have to go into the apartment of each and every customer and relight the pilots on their numerous appliances when the meter has been finally changed. Furthermore, the gas system will have to be purged of air. It has, therefore, been found quite convenient to incorporate some means of by-passing the meter connection so that the meter can be disconnected and replaced with a new meter without interruption to the customer's service supplied from the meter involved.

With systems presently available, the valves utilize composition seats and are very involved in terms of their linkage. The average service man who may be indifferent or apt to get confused with such an array of linkage, quite frequently does not operate the system in its proper sequence and the customer's service is interrupted (even though only momentarily, it may be enough to extinguish pilots). The by-pass then does not properly accomplish its function and the service man must go to each and every appliance of the gas customer and re-light the pilots, etc.

Many complex schemes have been introduced to prevent the lack of synchronization from occurring. However, they are involved and quite frequently miss their desired goal. Furthermore, the location of gas meters is such that weather, temperature, temperature change, and similar conditions are adverse if the valves involved use special types of composition elements which deteriorate, when the time arrives for the valve to be used, it will fail. A further shortcoming of presently available schemes is that they quite frequently employ a special tool, a tool that is specifically limited to this particular operation as well as special hose connections. Gas repairmen or servicemen must carry this tool in their truck in a special location and as is frequently the case, when the need for this tool arises, which may be infrequently, it is unavailable or perhaps broken. Another shortcoming of presently available schemes is that they permit gas to escape on the customer's premises and thereby results in a call back after the gas serviceman has left, or that they permit a momentary drop in pressure which may be sufficient to permit gas pilots to be extinguished.

Therefore, an object of this invention is to provide a simple by-pass gas meter hanger. Another object of this invention is to provide a by-pass gas meter hanger that does not require special tools.

Another object of this invention is to provide a gas meter by-pass hanger connection that does not employ specialized or involved linkage.

Another object of this invention is to provide a meter by-pass valve that will not cause a momentary drop in gas pressure during operation.

A still further object of this invention is to provide a gas meter by-pass valve that employs durable valves that when left for numerous years under very adverse conditions will be operative when the need arises.

Figure 3:
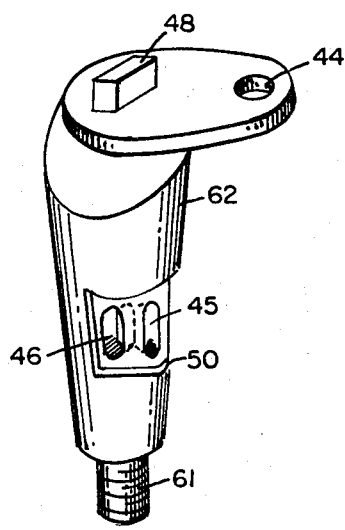

Other objects, advantages, and features of the present invention will become more apparent from the following specification, when taken in connection with the attached drawings of which FIGURE 1 shows a conventional meter attached to its hanger and the meter by-pass valve, FIGURE 2 is a blown up view of the meter hanger bar without the meter hanging from it, FIGURE 3 is a detailed view of the interior valve mechanism that is employed in the specific by-pass valve. FIGURE 4 shows the by-pass valve in the by-pass position. FIGURE 5 shows the by-pass valve in the halfway position.

Referring to FIGURE 1 meter 11 is shown hanging from meter hanger bar 20. This hanger has two special connections, 12 and 13, which have union nuts, 24 associated with the connection so that this meter can be disconnected from the hanger very easily. Union 17 is shown at the gas inlet side which is connected to the gas main. Another connection 22 is a coupling which is connected to the customer's service. By means of this coupling, which is attached to the presently established pipes, the hanger bar is then connected to the coupling by rotating it taking up the thread. The service pipe coming in from the street is then made up by means of union 17.

Hanger bar 20 has two valves associated with it, valve 15 which is a conventional straight through gas valve and valve 23 which is a special three-way gas valve.

Referring to FIGURE 2 gas hanger bar 20 is shown in greater detail. Gas entering by way of the service pipe through union 17 passes through opening 16 in the bar and may take the by-pass direction 13 through the bar towards valve 23, or if valve 15 is open, straight through opening 33 all the way through to meter connection 13 and there through the meter until it comes out at the other side of the meter at meter connection 12.

Looking further at valve 15, it is seen by dotted lines that the path is straight through or not at all if 42 were rotated 90° by a wrench. The wrench (which can be any conventional type or for that matter—gas plier) is attached to the rectangular raised portion of 42 and when turned, will cause the valve stem to rotate preventing the gas from passing through the valve. This is a well known valve and has a reputation for being both rugged and reliable. Noting that hole 14 is provided to permit the gas valve to be locked, any conventional lock can pass through opening 41 in valve 42 and through a corresponding opening in the valve body of valve 15.

Examining the special valve 23 we see that it is similar in construction to valve 15 having means for locking it in place by way of hole 44, and that it has a raised portion 48 which can be operated by means of a conventional open end wrench. However, we observe a dotted area 50 which nearly encircles the entire area of the valve in addition to which we see the dotted openings straight through opening 46 and a halfway opening 45 normal to opening 46. When this valve, like the other valve mentioned 15, is rotated, it will shut off the gas at one inlet and permit the gas to pass through another valve inlet to the outlet.

In FIGURE 2 the valve is shown blocking by-pass connector 20 inlet so that the gas cannot enter from this inlet. It is also shown that straight through port 46 is in perfect alignment with the gas meter connection 12 and the feed port to the house connection 22. This permits gas to flow from the meter through the by-pass valve to the customer's appliances. In FIGURE 4 the valve element 62 is shown turned 90° to the left, or rather counter-clockwise. Here it is seen that gas can enter by-pass valve 23 by means of the opening in meter bar 20, through the valve opening 46, up through opening 45 to the customer's appliances by way of port 43. It is further seen that meter connection 12 is also blocked off by means of the rotated valve element 62.

The three parts, together with the radial feed, thus provide continuous uninterrupted contact with the gas such that a pressure drop at outlet 22 is impossible.

In FIGURE 5 we see the valve turned up 45° from the open position in a counter clockwise direction. This is the halfway position as will be explained more further as we proceed. Gas in the by-pass hanger can skirt the valve by means of sliced away portion 50 and travel up through port 43, and thereby to the customer's appliances, without going through the meter. Additionally, gas could come up through the meter connection 12 and then skirt around the side of valve opening 50 which is a circumferential cut in valve stem 62 and up to the customer's appliances.

A more complete understanding of the present invention can be had by following the sequence of operation of the by-pass mechanism. Referring once again to FIGURE 1 you see that valve 15 is independent and separate from that of valve 23. Valve 15 will ordinarily control the on and off operation—the valve that the householder or apartment dweller will have access to. By-pass valve 23 by means of locking provision 44 will not be accessible to customers; that is, valve 23 will be locked permanently with a lock supplied by the gas company. Whenever the customer wishes to turn off the gas service, he can turn valve 15 which will prevent the gas from entering meter 11.

When a gas serviceman enters at the location and wishes to replace the meter, he will remove the lock or gas seal that will be located in locking provisions 44. When the lock is removed, he will turn the by-pass valve 90° counter clockwise as shown in FIGURE 4. Stop 81 is provided to prevent the valve from being rotated in the wrong direction. This will permit gas to go through the by-pass valve to the customer's location. It will be seen that this gas connection, by means of opening 50, which is circumferential above the valve stem when the valve is in a 45° position, gas is being fed to the customer both by means of by-pass and by means of the usual meter path. There is a perfectly smooth transition from one feed means through the meter to the second feed means by way of the by-pass, making it impossible for a pressure drop to occur.

At any rate, when the valve is on the full by-pass (90° FIG. 4) position the customer's supply is being fed through the by-pass, and the meter feed 12 is closed off. At this point, the serviceman will turn to valve 15, and cut the flow of gas into the meter. Union connections 24 will be loosened and the meter will be removed. A new meter will be placed in the location and union fittings 29 will be taken up securing the new meter in place. Valve 15 will then be opened and gas will again be supplied to the meter; at this point, plug 25 is removed and the air which would be trapped in the meter that was just placed in location would be purged from the meter eliminating all air in the system. Plug 25, when this has been accomplished, will be replaced.

Outlet 22 does not provide means for attachment of a manometer in order to check whether supply pressure has dropped any time during transition. In the case of the present invention, such a connection is not needed, for a pressure drop is impossible.

By-pass valve 23 will be again closed and a lock inserted in opening 44, locking the by-pass valve in place restoring normal metered gas service to the customer. It will be seen that the customer has been without interrupted service; a perfectly smooth transition from metered service to by-passed service back to metered service has been accomplished with little difficulty.

Referring now to FIGURE 3 we see the element 48 that is inserted in the body of valve 23. We note that it has tapered sides and appears very much like the conventional gas valve. Sloping surface 62 is usually coated with a composition of graphite and oil that seals the moving element 48 and does not permit gas to leak around its sides to the outside or from inlet to outlet when the valve is closed. Modern O rings for sealing the gas cock may also be incorporated. We also note that there is an opening 46 that resembles a conventional opening in any gas valve. We have an additional opening 45 that is normal to this that provides the by-pass; i.e., the three-way valve mechanism that accomplishes the by-passing as shown in valve 23. We also note the circumferential cut 50. This permits a smooth transition from meter feed to by-pass feed and again from by-pass feed to meter feed when element 48 is rotated. The cross sectional area that 50 presents to the meter service at any one given moment could be selected such that it is smaller than or equal to the straight through normal opening 46. This permits the unit to operate while offering a predetermined resistance to the flow of gas through it. That is, it could be arranged such that the customer could not have a full load on the system without introducing difficulty when the meter is by-passed. This would discourage theft if someone were able to remove the by-passed lock or by some other means opened the by-pass valve. However, little difficulty will be experienced in this area for the gas meter will be read periodically and the usual special seal which will be used to lock the locking mechanism that will be inserted in hole 44 and it will be readily apparent when the seal has been removed (if such is the case) and the by-pass opened. Again, to avoid the theft of gas, opening 45, which is normally to straight through opening 46 can be made smaller to introduce some turbulence or interference in the by-pass line such that the installation would not be able to handle a full load continuously. We see at the end of this tapered gas valve element 62 a threaded portion 61. Threaded portion 61 is conventional and a nut is placed on the end of it together with a washer which holds the element in place. The cock may be frozen in place after several years, if the unit has not been used. In such case, the nut can be backed off, the element hit slightly with the tool, same thereby loosening up the gas cock so that it can be rotated freely from an open to a closed position. This points up one of the advantages of this invention, in that it can be left for a number of years and when it is needed can be put to use by simply loosening the valve as I have stated above, to wit: loosening the nut, driving the tapered valve out of its socket slightly, turning the valve element within its socket, and of course tightening the nut again so that no leaking will occur.

The present system could easily be extended and modified by one skilled in the art to metered oil, steam or any fluid medium. Therefore, this invention is not to be limited to a specific medium such as illuminating gas, but it is contemplated the present invention is applicable to all fluid mediums.

While I have described my invention with reference to specific apparatus, it is to be clearly understood that this description is only made by way of example and not as a limitation on the scope of my invention as set forth in the objects thereof and in the accompanying claim.

What is claimed is:
1. A fluid meter service hanger bar having:
   an inlet and an outlet; first and second meter connections; a conventional two-way gas cock valve at the inlet end of said bar for controlling fluid flow from said inlet to said first meter connection;
   interconnecting means between said inlet and said outlet bypassing said two-way gas cock and said meter connections;
   a three-way gas cock valve at the outlet end of said bar having intersecting passageways in the core of said gas cock providing three spaced openings around the circumference of said core for controlling gas flow from said second meter connection to said outlet, and alternatively for controlling the flow of gas from said interconnecting means to said outlet;
   a circumferential groove in the core of said three-way gas cock interconnecting the three openings for preserving outlet gas pressure when the gas supply is being transferred from feeding through the meter to feeding through the by-pass interconnecting means;
means for locking said three-way valve in place;
means for bleeding air from said system at said second meter connection.

References Cited

UNITED STATES PATENTS

| | | | |
|---|---|---|---|
| 305,831 | 9/1884 | McArthur | 137—625.47 X |
| 2,765,809 | 10/1956 | Lamar | 137—625.3 X |
| 2,854,027 | 9/1958 | Kaiser | 251—368 X |
| 3,238,969 | 3/1966 | Champion | 137—599.1 |
| 3,276,475 | 10/1966 | Kinker | 137—625.3 |
| 3,296,861 | 1/1967 | Mueller | 137—599.1 X |

WILLIAM F. O'DEA, *Primary Examiner.*

D. H. LAMBERT, *Assistant Examiner.*